United States Patent [19]

Bellofatto

[11] Patent Number: 4,790,758

[45] Date of Patent: Dec. 13, 1988

[54] AIR NAVIGATIONAL INSTRUMENT SIMULATION AND INSTRUCTIONAL AID

[76] Inventor: Richard C. Bellofatto, 4 Lewis Cir., Peabody, Mass. 01960

[21] Appl. No.: 143,455

[22] Filed: Jan. 12, 1988

[51] Int. Cl.⁴ .............................................. G09B 9/02
[52] U.S. Cl. .................................................. 434/243
[58] Field of Search ................... 434/239, 243, 49, 244

[56] References Cited

U.S. PATENT DOCUMENTS

| | | | |
|---|---|---|---|
| 2,396,141 | 3/1946 | Adorjan et al. | 434/239 |
| 2,402,271 | 6/1946 | Andrews | 434/243 |
| 2,404,386 | 7/1946 | Levine et al. | 434/243 |
| 3,364,297 | 1/1968 | Osborne, Jr. | 434/243 |
| 3,628,256 | 12/1971 | Story | 434/239 |
| 3,906,643 | 9/1975 | McClung | 434/243 |
| 4,095,351 | 6/1978 | Eisele | 434/243 |
| 4,173,080 | 11/1979 | Minnicks, III | 434/243 |
| 4,226,028 | 10/1980 | Robson | 434/243 |
| 4,608,022 | 8/1986 | Bellofatto | 434/243 |

*Primary Examiner*—William H. Grieb
*Attorney, Agent, or Firm*—Donald W. Meeker

[57] ABSTRACT

A hand-held movable airplane model is equipped on an outer face with an outer rotatable donut shaped disc and an inner stationary black circular disc. The outer disc, having compass markings, is rotated by turning a simulated OBS knob to simulate a course card. Indicator needles and flags on the stationary inner disc simulate V.O.R. and Gliode Slope indicators as they would actually appear on an airplane in similar positions and orientations to those of the model as the model is moved over a vertical surface simulating a flight pattern. All needles and flags on the model rotate on pivot pins through the inner disc. Tabs on the underside of each needle and flag are positioned beneath an elasticised band with a high friction surface. The band stretched around the periphery of the inner disc hold all of the needles and flags in place as they are oriented by hand.

11 Claims, 1 Drawing Sheet

AIR NAVIGATIONAL INSTRUMENT SIMULATION AND INSTRUCTIONAL AID

BACKGROUND OF THE INVENTION

1. Technical Field

The present invention relates to simulators for airplane panel instruments used as ground training aids, and in particular to instrument simulators manually actuated and used with a fully movable hand-held model of the airplane.

2. Background Art

Learning the complexities of flying instruments and their uses in navigating is greatly facilitated by simulators of the instruments viewed in conjunction with the orientation and motion of a model airplane to understand exactly what the readings on the actual instruments mean relative to the action of the actual airplane.

None of the prior art devices provide a means for total unrestricted motion of the airplane model over the surface used to indicate the flight pattern and still provide a true simulation of the actual instruments as they would be viewed by a pilot in the actual airplane.

None of the prior art devices maintain an entirely unrestricted surface over which the direction of motion of the model is demonstrated.

Most of the prior art devices are very complex and expensive with gears, electrical apparatus or structural components.

None of the prior art devices provide a simple single means for holding all of the indicator gages, flags and dials each in its own desired position on the simulation.

DISCLOSURE OF INVENTION

By providing a virtual simulation of the actual flight insturments in appearance and including all components in proper relative orientation and detail in combination with a hand-held model of the aircraft which may be moved freely in any direction or orientation over the field of all potential routes of travel, a much better understanding can be learned of the complex interaction between the actual instruments and the true significance of their readings relative to the action of the aircraft.

Providing a model having self-contained controls permits total freedom of movement over an unrestricted simulated field of flight.

Providing a simple elasticised band as the single element for holding all of the complex dials, flagns and indicator needles in desired positions creates a very inexpensive and easily fabricated way to produce complex flight instrument simulations.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
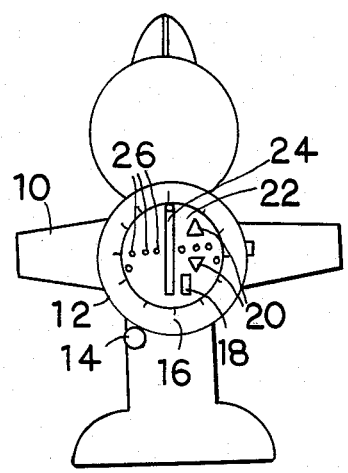
FIG. 1 is a top plan view o the simulated instrument mounted on the hand-held model, showing a simplified version of the instrument with only a VOR indicator and a position for another dial on the model.

In FIG. 1 the simulated instrument 12 is removably mounted on a rigid thin model 10 in the outline plane shape of an airplane formed of stiff inexpensive material such as plastic, wood or thick cardboard. The hand-held model 10 may be moved as desired over an external surface, such as a vertical surface representing the flight path area, and may be secured to the external surface preferrably by magnets on the underside of the model which could attach to a magnetically attractive surface. Tape could be used to secure the model to a surface which was not magnetically attractive. Movement and rotation of the model over the entire area of the unobstructed vertical surface enables the illustration of any type of flight patterns.

Figure 2:
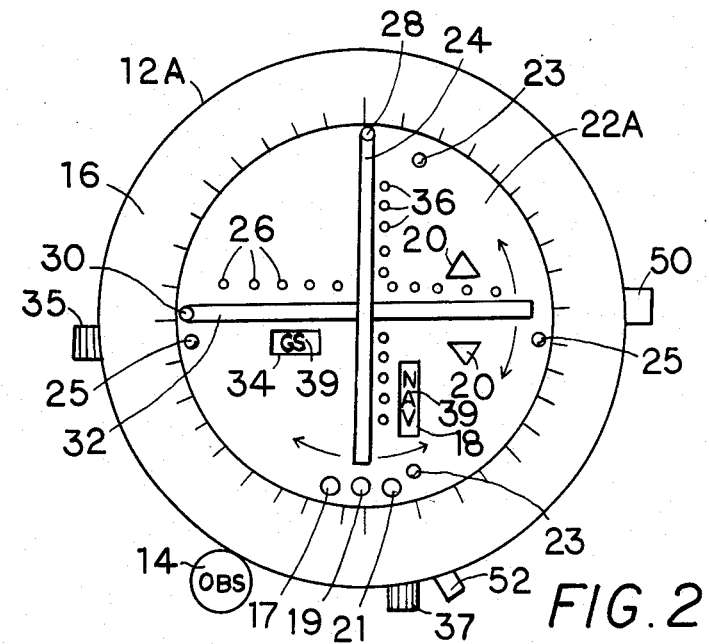
FIG. 2 is a top plan view of the preferred embodiment of the simulated instrument having both a VOR and GS indicators.

In FIGS. 1 and 2, rotationally mounted in the outside surface of the model 10, a flat donut-shaped course card 16 is marked with radial lines indicating the 360 degrees of the compass, to simulate the Course Card of a Very High Frequency Omni Range (V.O.R.) indicator dial. A simulated Omni Bearing Selector (OBS) knob 14 is rotatably connected to the hand-held model, positioned in contact with an outer edge of the course card. Rotating the OBS knob rotates the course card to simulate selecting a radial from a VOR beacon.

Within the donut-shaped course card 16 a black circular card 22 and 22A is mounted in a stationary position on the hand-held model to simulate the dial portion of the V.O.R. indicator dial. Pivotally mounted on the black circular card, at least one movable indicator element is mounted to simulate a needle, flag or indicator of the V.O.R. indicator dial.

Figure 3:
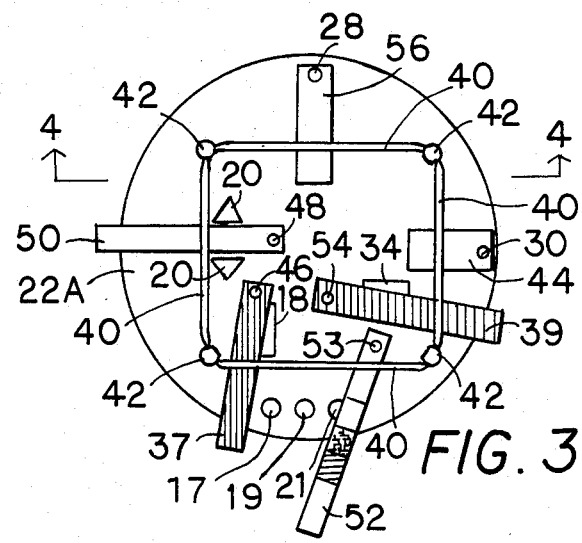
FIG. 3 is a bottom plan view of the preferred embodiment of the simulated instrument of FIG. 2.
Figure 4:
FIG. 4 is a cross-sectional view of the black circular disc of the preferred embodiment taken through 4—4 of FIG. 3.

In FIG. 3 a series of protruding hooks 42 are positioned on the bottom around the periphery of the black circular disc with each protruding hook bending outwardly toward an adjacent edge of the black circular disc. An elasticised band 40 having a high friction surface, such as a rubber band, is looped around the protruding hooks creating tension in the elasticised band so that at least one portion of a movable indicator element is positioned beneath the elasticised band and held in place by the tension and friction of the elasticised band. Each movable indicator is set to a desired position manually and held in position by the band means.

Each of two needle indicator elements 24 and 32 (FIG. 2) comprises an elongated needle-like indicator portion rigidly connected at a right angle to a first end of pivot pin 28 and 30, respectively, pivotally inserted through an opening in the black circular card. Rigidly connected to a second end of the pivot pin a tab-like control portion 56 and 44, respectively, (FIG. 3) extends from the pivot pin to underlie the friction band 40 and remain in contact with the friction band throughout the extent of the pivotal movement of the tab-like control portion.

An upper visible indicator portion of a first indicator element comprises a long pivotal needle 24 extending across the viewing face of the black circular card in approximate alignment with a longitudinal axis of the hand-held model to simulate a Deviation Indicator Needle. The Deviation Indicator Needle, rigidly connected at a right angle to a first end of a deviation indicator pivot pin 28, is pivotable (arrows) over a series of deviation indicator reference marks 26 indicated on the black circular card spaced in a line perpendicularly to the Deviation Indicator Needle to indicate the degree to which an aircraft is following the VOR signal. A deviation indicator protrusion 25 from the upper face at each of two ends of the Deviation Indicator Needle reference marks acts as a stop for the Deviation Indicator Needle.

Rigidly connected to a second end of the deviation indicator pivot pin 28, a tab-like deviation idicator control portion 56 (FIG. 3) extends from the deviation indicator pivot pin 28 to underlie the friction band 40 and remain in contact with the friction band throughout the extent of the pivotal movement of the tab-like control portion.

A first rectangular opening 18 through the black circular card adjacent to the Deviation Indicator Needle simulates a VOR off flag. A red tab 37 improved with white letters spelling "NAV" 39 is pivotally connected by a NAV flag pivot 46 to the bottom face of the black circular card adjacent to the first rectangular opening and contacting the frictional band. An end of the NAV tab 37, as seen in FIG. 2, protrudes beyond an outer edge of the course card for manual operation. The NAV tab may be pivoted under the first rectangular opening so that the "NAV" is visible through the opening. Otherwise the opening remains black.

Additional optional features on the dial include intercept glide slope markers 17, 19 and 21 comprising a series of three circular openings through the black circular card below the Deviation Indicator Needle 24, when the Deviation Indicator Needle is in an on-course position. A tricolored tab 52 (in FIG. 3) having blue, yellow and white sections is pivotally connected by pivot pin 53 to the bottom face of the black circular card adjacent to the three circular openings and positioned under the frictional band, so that an end of the tricolored tab 52 protrudes beyond an outer edge of the course card for manual operation, as seen in FIG. 2. The tricolored tab may be pivoted under a first circular opening 17 so that the blue is visible through the opening to simulate an outer marker indicator, under a second circular opening 19 so that the yellow is visible through the opening to simulate a middle marker indicator, and under a third circular opening 21 so that the white is visible through the opening to simulate an inner marker indicator.

A second indicator element 32 simulating a Glide Slope (G.S.) Indicator Needle is pivotally connected by to the black circular card 22A approximately at a right angle to the first indicator element 24. An upper visible indicator portion 32 of the second indicator element comprises a long pivotal needle extending across the veiwing face of the black circular card 22A approximately transversely to a longitudinal axis of the handheld model 10. The G.S. Indicator Needle 32, rigidly connected at a right angle to a first end of a G.S. Indicator pin 28, is pivotable (arrows) over a series of glide slope reference marks 36 indicated on the black circular card 22A spaced out in a line perpendicularly to the Glide Slope Indicator Needle to indicate the degree to which the aircraft is following the Glide Slope. The upper face of the black circular disc 22A further comprises a glide slope protrusion 23 from the upper face at each of two ends of the Glide Slope Indicator Needle reference marks, wherein the glide slope protrusions act as stops for the Glide Slope Indicator Needle.

Rigidly connected to a second end of the glide slope pivot pin 30 a tab-like glide slope control portion 44 (FIG. 3) extends from the glide slope pivot pin 30 to underlie the friction band 40 and remain in contact with the friction band throughout the extent of the pivotal movement of the tab-like control portion.

As an additional option, the black circular card 22A further comprises a second rectangular opening 34 through the black circular card adjacent to the Glide Slope Indicator needle 14. Related to the second rectangular opening, a red G.S. flag tab 35 printed with white letters spelling "GS" 39 is pivotally connected by G.S. flag pivot pin 54 to the bottom face of the black circular card adjacent to the second rectangular opening and contacting the frictional band 40, so that an end of the GS tab protrudes beyond an outer edge of the course card for manual operation as seen in FIG. 2. The G.S. tab may be pivoted under the second rectangular opening so that the "GS" is visible through the opening, thereby simulating a glide slope flag, wherein the frictional band 40 holds the GS tab in position.

Other additional features on the black circular card 22A comprise a pair of triangular openings 20 through the black circular card 22A adjacent to the Glide Slope Indicator Needle 14, when the Glide Slope Indicator Needle is in a horizontal position. The triangular openings 20 simulate To-From arrows positioned on opposite sides of the Glide Slope Indicator Needle. A white to-from tab 50 is pivotally connected by to-from pivot pin 48 to the bottom face of the black circular card between the triangular openings so that an end of the white to-form tab protrudes beyond an outer edge of the course card for manual operation (FIG. 2) and the white to-from tab 50 may be pivoted under either triangular opening so that the white is visible through the opening to indicate to-from indication. When the to-from tab is not under either triangular opening, both are black indicating that the aircraft is abeam of the station.

In use, the model with the simulated instrument dials can be moved by hand over a vertical surface representing the flight pattern and the needles and flags aligned to indicate the appropriate reading for each position and orientation ofthe aircraft. Such vivid and active demonstrations provide an excellent training basis for the flight student to understand exactly what each instrument would do no the instrument panel of an actual plane under similar flight conditions of the real plane.

It is understood that the preceding description is given merely by way of illustration and not in limitation of the invention and that various modifications may be made thereto without departing from the spirit of the invention as claimed.

I claim:

1. A classroom training aid for air navigational instrument simulation and instruction comprising:
    a hand-held model simulating an airplane movable by hand and mountable primarily my a magnetic means on a vertical surface, over the entire area of which vertical surface the model may be moved and secured in any direction and orientation to simulate actual routes of travel of the airplane;
    at least one simulated navigational instrument mounted on the model appearing and acting correspondingly to the appearance and apparent action of the actual navigational instrument on the airplane, which instrument comprises a Very High Frequency Omni Range (V.O.R.) indicator, wherein the V.O.R. Indicator comprises a black circular card mounted on the hand-held model within a rotatable flat donutshaped disc having compass markings simulating a course card, and pivotally mounted on the black circular card, at least one movable indicator element;

and wherein a simulated Omni Bearing Selector (OBS) knob is rotatably connected to the hand-held model, positioned in contact with an outer edge of the course card, and rotating the OBS knob rotates the course card to simulate selecting a radial from a VOR beacon;

a tensioned high friction band means stretched over a portion of a bottom face of the black circular card, wherein the band means serves to control at least one movable indicator element, wherein the movable indicator is set to a desired position manually and held in position by the band means;

and wherein an indicator element comprising an upper visible indicator portion is positioned visibly on an upper face of the black circular disc and, rigidly connected to the upper visible indicator portion a lower control portion is positioned on the bottom face of the black circular card in contact with the friction band means so that the friction band means holds the indicator element in a desired position.

2. The invention of claim 1 wherein the black circular disc further comprises a series of protruding hooks positioned on the bottom around the periphery of the black cicular disc with each protruding hook bending outwardly toward an adjacent edge of the black circular disc, wherein an elasticised band having a high friction surface is looped around the protuding hooks creating tension in the elasticised band so that at least one portion of a movable indicator element positioned beneath the elasticised band is held in place by the tension and friction of the elasticised band.

3. The invention of claim 2 wherein the indicator element comprises an elongated needle-like indicator portion rigidly connected at a right angle to a first end of pivot pin pivotally inserted through an opening in the black circular card, and rigidly connected to a second end of the pivot pin, a tab-like control portion extending from the pivot pin to underlie the friction band and remain in contact with the friction band throughout the extent of the pivotal movement of the tab-like control portion.

4. The invention of claim 3 wherein an upper visible indicator portion of a first indicator element comprises a long pivotal needle extending across the viewing face of the black circular card in approximate alignment with a longitudinal axis of the hand-held model to simulate a Deviation Indicator Needle pivotable over a series of reference marks indicated on the black circular card spaced in a line perpendicularly to the Deviation Indicator Needle to indicate the degree to which an aircraft is following the VOR signal.

5. The invention of claim 4 wherein the upper face of the black circular disc further comprises a deviation indicator protrusion from the upper face at each of the two ends of the Deviation Indicator Needle reference marks, wherein the deviation indicator protrusions act as stops for the Deviation Indicator Needle.

6. The invention of claim 4 wherein the black circular card further comprises a first rectangular opening through the black circular card adjacent to the Deviation Indicator Needle, wherein a red tab imprinted with white letters spelling "NAV" is pivotally connected to the bottom face of the black circular card adjacent to the first rectangular opening and contacting the frictional band, so that an end of the NAV tab protrudes beyond an outer edge of the course card for manual operation and the NAV tab may be pivoted under the first rectangular opening so that the "NAV" is visible through the opening, thereby simulating a VOR off flag, wherein NAV tab is held in position by the frictional band.

7. The invention of claim 4 wherein the black circular card further comprises a series of three circular openings through the black circular card below the Deviation Indicator Needle, wherein a tab tricolored blue, yellow and white is pivotally connected to the bottom face of the black circular card adjacent to the three circular openings and positioned under the frictional band, so that an end of the tricolored tab protrudes beyond an outer edge of the course card for manual operation and the tricolored tab may be pivoted under a first circular opening so that the blue is visible through the opening, under a second circular opening so that the yellow is visible through the opening and under a third circular opening so that the white is visible through the opening, thereby simulating intercept glide slope markers, wherein the tricolored tab is held in position by the frictional band.

8. The invention of claim 4 further comprising a second indicator element pivotal connected to the black circular card approximately at a right angle to the first indicator element, wherein an upper visible indicator portion the second indicator element comprises a long pivotal needle extending across the viewing face of the black circular card approximately transversely to a longitudinal axis of the hand-held model to simulate a Glide Slope Indicator Needle pivotable over a series of glide slope reference marks indicated on the black circular card spaced out in a line perpendicularly to the Glide Slope Indicator Needle to indicate the degree to which the aircraft is following the Glide Slope.

9. The invention of claim 8 wherein the upper face of the black circular disc further comprises a glide slope protrusion from the upper face at each of two ends of the glide slope reference marks, wherein the glide slope protrusions act as stops for the Glide Slope Indicator Needle.

10. The invention of claim 8 wherein the black circular card further comprises a second rectangular opening through the black circular card adjacent to the Glide Slope Indicator Needle, wherein a red tab imprinted with white letters spelling "GS" is pivotally connected to the bottom face of the black circular card adjacent to the second rectangular opening and contacting the frictional band, so that an end of the GS tab protrudes beyond an outer edge of the course card for manual operation and the GS tab may be pivoted under the second rectangular opening so that the "GS" is visible through the opening, thereby simulating a glide slope flag, wherein the frictional band holds the GS tab in position.

11. The invention of claim 8 wherein the black circular card further comprises a pair of triangular openings through the black circular card adjacent to the Glide Slope Indicator Needle, wherein the triangular openings represent an arrow positioned on opposite sides of the Glide Slope Indicator Needle, and wherein a white tab is pivotally connected to the bottom face of the black circular card between the triangular openings so that an end of the white tab protrudes beyond an outer edge of the course card for manual operation and the white tab may be pivoted under either triangular opening so that the white is visible through the opening, thereby simulating a "to-from" indicator.

* * * * *